United States Patent
Tallarek

Patent Number: 6,028,416
Date of Patent: Feb. 22, 2000

[54] METHOD OF DELIVERING A DIFFUSE DUTY CYCLE

[75] Inventor: Glen E. Tallarek, Grosse Pointe Woods, Mich.

[73] Assignee: Chrysler Corporation, Auburn Hills, Mich.

[21] Appl. No.: 09/164,095

[22] Filed: Sep. 30, 1998

[51] Int. Cl.[7] .................................................. H02P 9/10
[52] U.S. Cl. ............................................................ 322/59
[58] Field of Search ................................. 322/59, 69, 70

[56] References Cited

U.S. PATENT DOCUMENTS

| | | | |
|---|---|---|---|
| 4,629,968 | 12/1986 | Butts et al. | 322/29 |
| 5,427,070 | 6/1995 | Thomas et al. | |
| 5,497,069 | 3/1996 | Shriver et al. | 322/19 |
| 5,523,672 | 6/1996 | Schramm et al. | 322/25 |
| 5,528,148 | 6/1996 | Rogers | 324/426 |
| 5,801,516 | 9/1998 | Rice et al. | 322/37 |
| 5,907,233 | 5/1999 | Jabaji | 322/28 |

*Primary Examiner*—Nestor Ramirez
*Assistant Examiner*—Peter Medley
*Attorney, Agent, or Firm*—Mark P. Calcaterra

[57] ABSTRACT

A method for controlling the duty cycle of a pulse width modulated (PWM) output signal applied to a field winding of an alternator of a motor vehicle. The PWM signal is generated from a controller associated with a vehicle engine to control the output current from a vehicle alternator during engine operation. The method involves determining a desired duty cycle for the PWM signal to be applied to the field winding of the alternator. The method then involves determining the PWM signal's "ON" and "OFF" pattern to deliver the desired duty cycle. This is accomplished by adding the value corresponding to the desired duty cycle to a running sum value. The PWM signal to the alternator is turned "ON" if the new running sum value exceeds or is equal to 100. One-hundred is then subtracted from the running sum value before it is stored. However, if the new running sum value is less than 100, then the PWM signal is turned "OFF" and the new running sum value is then stored without subtracting 100. On the next cycle, the desired duty cycle is again added to the presently stored running sum value to produce a new value which is again checked to determine if it is greater than or equal to 100, and the above steps are repeated. The method provides better control over the duty cycle of the PWM signal which contributes to a more steady-state output of the alternator and better response to brief electrical impulses experienced by the alternator as a result of activation of various electrical subsystems of a vehicle at low engine idle speeds.

14 Claims, 1 Drawing Sheet

METHOD OF DELIVERING A DIFFUSE DUTY CYCLE

BACKGROUND OF THE INVENTION

1. Technical Field

This invention relates to systems for controlling the current provided to an alternator of a motor vehicle, and more specifically to a method for controlling the duty cycle of a pulse-width-modulated signal applied to an alternator field winding, which provides a high degree of control over the resolution of the duty cycle to thereby afford a high degree of control over the signal applied to the field winding of the alternator.

2. Discussion

The basic method of regulating the voltage level of a battery of a motor vehicle during vehicle operation consists of controlling the RMS electrical current supplied to the field winding of the vehicle's alternator. The amount of energy that the alternator produces is directly proportional to the RMS electrical current being supplied to the field winding of the alternator and is also directly proportional to the speed at which the alternator armature is rotating. Controlling the RMS electrical current being supplied to the alternator field winding is typically achieved by delivering a pulse-width-modulated control signal to the alternator field circuit. In the steady-state mode, this can be accomplished by driving the alternator field control output port of a microprocessor associated with an engine controller of the vehicle in a prescribed "ON"/"OFF" pattern that effectively delivers one of several different duty cycles for the pulse-width-modulated (PWM) signal. For example, seven different duty cycles (i.e., 0%, 12.5%, 25%, 50%, 75%, 87.5% and 100%) could be employed. The duty cycle value delivered to the alternator field circuit could be updated once every few milliseconds (such as 3 ms–4 ms). The decision as to which one of the seven duty cycles to use could simply be based on the magnitude and sign of the difference between the most recent battery voltage level and the voltage regulator setpoint (the "desired" or "goal" battery voltage value). The measure of the battery voltage level could be obtained from an analog to digital conversion that would occur in the duty cycle control routine.

While the above-described method of choosing a duty cycle is adequately effective for applying several different, predetermined duty cycles to the alternator to control the percent of time that the field winding of the alternator is energized, the method does not consider the electrical load level on the engine of the vehicle at any given time, nor does it consider the rotational speed of the engine at any given time. Furthermore, the limited choices of duty cycles make it difficult to accurately control the battery voltage level over the wide range of engine operational conditions. All these factors impact on the system performance and contribute to a relatively "noisy" signal being applied to the alternator field winding which results in a similar "noisy" signal being applied to the battery (and the whole system) from the alternator output.

Possibly the biggest drawback of the present method of applying one of several predetermined duty cycles is that this method is limited in managing the application of higher alternator field duty cycles in response to "step" or "impulse" electrical loads. Such impulse electrical loads may be generated by activation of such devices as the radiator fan motor, the rear window heater and/or window motors typically employed in motor vehicles, just to name a few. This limitation can significantly contribute to engine speed instabilities at or near park/neutral and drive/reverse idle speeds. Presently used algorithms typically employ a few different methods to detect these types of loads and then attempt to manage the application of increasing alternator duty cycles. For example, when it is desired to turn the radiator fan motor "ON," one method first opens the idle speed bypass valve a prescribed number of steps, delays a prescribed length of time and then turns the radiator fan motor "ON." Unfortunately, this method typically causes the engine speed to flare slightly before dropping noticeably when the radiator fan motor is finally turned "ON." Consequently, the idle speed is not made any more stable. Rather, the idle speed is just caused to fluctuate around a higher level which is intended to reduce the possibility of engine stall.

Accordingly, it would be highly desirable to provide a method of controlling the duty cycle of a PWM signal applied to the alternator field winding which better compensates for sudden, significant electrical loads experienced by the charging system during vehicle operation. An improved method of delivering the duty cycle would provide better control over the alternator output, which would help to prevent the abrupt changes in alternator loading on the engine which cause fluctuations in engine speed at low idle when various accessories of the vehicle are switched "ON" or "OFF." Such an improved method for controlling the duty cycle of a PWM signal applied to the alternator would also allow a more steady-state charging current to be applied to the battery by the alternator even when various electrical accessories of the vehicle are switched "ON" and "OFF."

SUMMARY OF THE INVENTION

The method of the present invention relates to a method for controlling the duty cycle of a pulse-width-modulated (PWM) signal applied to the field circuit of an alternator of a motor vehicle. The PWM signal applied to the alternator field circuit is applied by turning an output port of a controller "ON" and "OFF," wherein the output port, when turned "ON," supplies an electrical current to energize the field winding of the alternator.

The method involves a means for controlling the duty cycle with a high degree of resolution, and further, in a manner to provide extremely smooth and easy transitions between different duty cycle values. The method involves defining a "running sum" value (to be used in the on-going background calculations) which can be initially set to 0. The method also involves determining a "desired duty cycle" value (which would range in value from 0 to 100 to represent 0% to 100% duty cycle) for the PWM signal to be applied to the alternator of the vehicle. The process of the method first involves adding the desired duty cycle value to the running sum value. The method next involves determining if the new sum value is greater than or equal to 100. If the new sum value is greater than or equal to 100, then (1) 100 is subtracted from this value, (2) the new difference is stored back to the running sum value for the next iteration, and (3) the digital output port of a controller (used for applying the PWM signal to the alternator) is turned "ON". If the new sum value is less than 100, then (1) the new sum is stored back to the running sum value for the next iteration, and (2) the digital output port of a controller (used for applying the PWM signal to the alternator) is turned "OFF."

After a predetermined time period, the desired duty cycle is again added to the running sum value. The above-described steps of determining whether the new sum value is greater than or equal to 100, or less than 100, determines if the controller port is turned "ON" or is turned "OFF." Over any given number of cycles, for example 100 cycles, the total number of cycles during which the port is turned "ON" represents the duty cycle of the PWM signal. Thus, if the desired duty cycle were 63%, the above-described method would produce 63 "ON" pulses every 100 cycles. However, the time required to "deliver" the desired duty cycle to within ±5% is much shorter than 100 cycles. For example, if the desired duty cycle were 63%, the above-described method would produce 6 "ON" pulses after 10 cycles (60%) and would produce 13 "ON" pulses after 20 cycles (65%). Each "ON" pulse would have a pulse width equal to the cycle time. Thus, if the method involved a cycle time of 4 ms, meaning that every 4 ms the steps of the present method are executed through to completion, then each "ON" pulse of the port of the controller would be 4 ms in duration or a multiple thereof (e.g., 8 ms, 12 ms, 16 ms, etc.).

A significant advantage to the above-described method is that the duty cycle can be controlled up to a 1% (or greater) resolution. Another significant advantage is that the method of the present invention delivers a PWM signal that automatically incorporates a high degree of "diffusion." This diffusion can reduce the possibility of lower frequency pattern "beating." Yet another significant advantage is the simplicity of the calculations. This simplicity would allow the method to be incorporated and executed in higher frequency, shorter cycle software "loops." Delivering a PWM signal that has shorter cycle times allows the system to more closely simulate a varying analog voltage direct current source. The ability to deliver a signal that more closely simulates a varying analog voltage direct current source to the alternator's field circuit has been shown to help reduce the "noise" associated with slower digital control signals that can eventually be seen as fluctuations on the output signal of the alternator.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
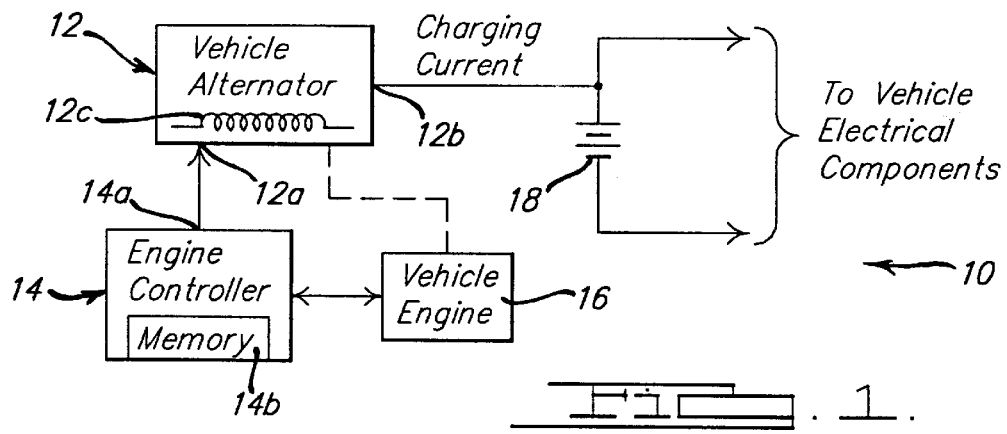
FIG. 1 is a simplified block diagram showing the interconnections of the vehicle alternator, engine controller, vehicle engine and vehicle battery of a motor vehicle.

Referring to FIG. 1, there is shown a simplified block diagram 10 illustrating a vehicle alternator 12, an engine controller 14, a vehicle engine 16 and a vehicle battery 18. As is well known in the art, the engine controller 14 is used to control a variety of engine functions and to receive various information from the vehicle engine 16. The engine controller 14 has an output port 14a which supplies a pulse-width-modulated (PWM) signal to an input 12a of a field winding 12c of the alternator 12. A memory 14b, which may be a random access memory, is used for storing various information used by the controller. As will also be appreciated with conventional vehicle electrical systems, the alternator 12 has an output 12b which is used to supply a charging current to the vehicle battery 18 and also electrical power to the other various electrical components of the vehicle.

With previous systems, one of a plurality of predetermined duty cycles is selected for the PWM signal and applied to the alternator field circuit 12c. For example, many prior developed systems might incorporate seven different duty cycles (e.g., 0%; 12.5%, 25%, 50%, 75%, 87.5% and 100%) and select from one of these seven duty cycles the one that most closely matches the desired duty cycle. As will be appreciated immediately, however, this arrangement does not provide for extremely accurate control over the duty cycle of the PWM signal applied to the alternator 12.

In the alternator 12 shown in FIG. 1, the output signal from the engine controller 14 is applied to the field winding 12c of the alternator. The field winding is in communication with the input 12a of the alternator. As will be appreciated, when only a limited number of duty cycles may be chosen from, it is difficult for the engine controller 14 to control the duty cycle of the PWM signal used to energize and de-energize the field winding 12c closely enough to counteract the noise and electrical impulses which the vehicle electrical system experiences when various components such as radiator fans, rear window defrosters, electric motors, etc., are activated and deactivated. This can cause the output of the alternator 12 to vary somewhat momentarily, which may result in momentary fluctuations in engine idle speeds and overall system voltage level. Other factors that influence the output of the alternator 12 are larger intake manifolds of present day vehicles which create a larger delay time in engine RPM response to idle speed control valve (AIS) steps, smaller capacity vehicle batteries which result in less capacity to handle large, momentary current draws, and lower engine idle speeds which result in less efficient alternator operation. All totaled, these factors, singly and in combination, can operate to cause undesired engine speed and system voltage fluctuations at idle.

Figure 2:
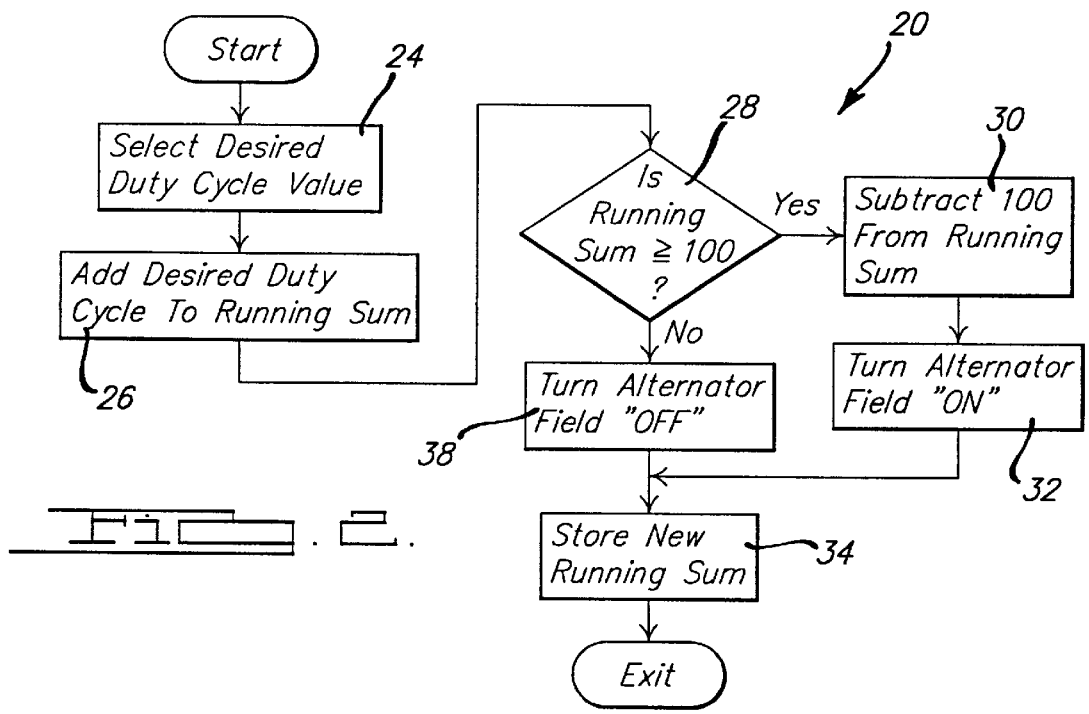
FIG. 2 is a flow chart illustrating the steps of a preferred method in accordance with the present invention.

Referring now to FIG. 2, a flow chart illustrating a preferred method 20 in accordance with the present invention is illustrated. The method utilizes a running sum value that is stored in the memory 14b of the controller 14. The running sum value should be initialized to zero just once before the periodic execution of the method of the present invention. The controller 14 executes the routine of the present invention on a regular and periodic frequency. When the routine is executed, it first determines the desired duty cycle value for the alternator field circuit, as indicated at step 24. The desired duty cycle value is that value which the engine controller 14 has determined is needed for the PWM signal applied to the alternator 12 to provide the proper alternator output in view of the electrical loads being experienced by the alternator 12 at that moment. The desired duty cycle value is then added to the latest running sum value, as indicated at step 26. This new running sum value is then checked by the controller 14 to determine if the value is greater than or equal to 100, as indicated at step 28. If this determination produces a "YES" answer, then 100 is subtracted from the running sum value as indicated at step 30. The engine controller 14 then switches the output port to "ON," thereby applying a signal to the field winding 12c, which energizes the field winding and thereby causes the alternator 20 to generate an output signal at output 12b thereof, as indicated at step 32. The adjusted new running sum value is then stored in the memory 14b of the controller 14, as indicated at step 34. The method then exits for this particular execution instance of the method.

With further reference to FIG. 2, if the determination at step 28 indicates that the new running sum value is less than 100, then the signal at output port 14a is turned "OFF," as indicated at step 38. This causes the field winding 12c to be de-energized, thus turning "OFF" the alternator output at output port 12b. The new running sum value is then stored at step 34 and the method exits for this particular execution instance of the method.

Figure 3:
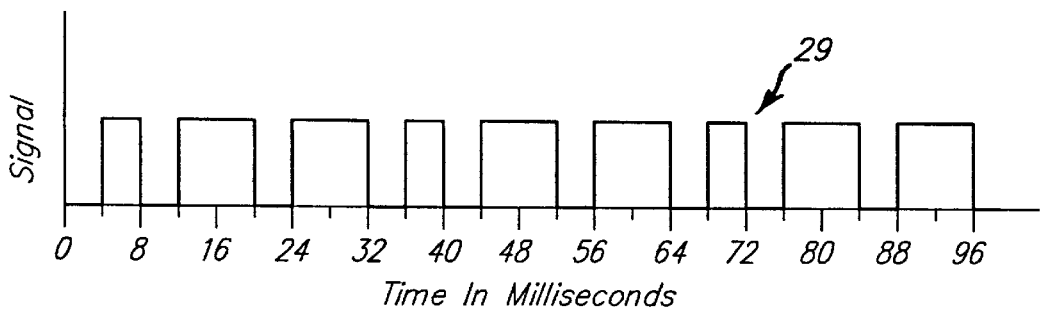
FIG. 3 is a timing diagram illustrating the duty cycle of a PWM output signal from a controller used to energize the field winding of an alternator, and exemplifying a 63% duty cycle obtained in accordance with the calculations set forth in Table A of the specification.

An exemplary PWM output signal waveform 29 having a 63% duty cycle is shown in FIG. 3 using four milliseconds as the cycle time (ie., the port control method is executed once every four milliseconds). This waveform illustrates 24 four millisecond cycles. During this period the PWM signal is high for fifteen cycles, producing an approximate 63% duty cycle. The following table illustrates the addition and subtraction that takes place through 25 "cycles" of the above-described flow chart, assuming a constant desired duty cycle value of 63%.

TABLE A

| CYCLE | RUNNING SUM | | DUTY CYCLE | | NEW RUNNING SUM | PORT STATE |
|---|---|---|---|---|---|---|
| 0 | 0 | + | 63 | = | 63 | OFF |
| 1 | 63 | + | 63 | = | 126 − 100 = 26 | ON |
| 2 | 26 | + | 63 | = | 89 | OFF |
| 3 | 89 | + | 63 | = | 152 − 100 = 52 | ON |
| 4 | 52 | + | 63 | = | 115 − 100 = 15 | ON |
| 5 | 15 | + | 63 | = | 78 | OFF |
| 6 | 78 | + | 63 | = | 141 − 100 = 41 | ON |
| 7 | 41 | + | 63 | = | 104 − 100 = 4 | ON |
| 8 | 4 | + | 63 | = | 67 | OFF |
| 9 | 67 | + | 63 | = | 130 − 100 = 30 | ON |
| 10 | 30 | + | 63 | = | 93 | OFF |
| 11 | 93 | + | 63 | = | 156 − 100 = 56 | ON |
| 12 | 56 | + | 63 | = | 119 − 100 = 19 | ON |
| 13 | 19 | + | 63 | = | 82 | OFF |
| 14 | 82 | + | 63 | = | 145 − 100 = 45 | ON |
| 15 | 45 | + | 63 | = | 108 − 100 = 8 | ON |
| 16 | 8 | + | 63 | = | 71 | OFF |
| 17 | 71 | + | 63 | = | 134 − 100 = 34 | ON |
| 18 | 34 | + | 63 | = | 97 | OFF |
| 19 | 97 | + | 63 | = | 160 − 100 = 60 | ON |
| 20 | 60 | + | 63 | = | 123 − 100 = 23 | ON |
| 21 | 23 | + | 63 | = | 86 | OFF |
| 22 | 86 | + | 63 | = | 149 − 100 = 49 | ON |
| 23 | 49 | + | 63 | = | 112 − 100 = 12 | ON |
| 24 | 12 | + | 63 | = | 75 | OFF |
| 25 | 75 | + | 63 | = | 138 − 100 = 38 | ON |

The method of the present invention provides for high resolution control over the duty cycle of the PWM signal applied to the alternator field winding 12c. As can be seen, the duty cycle can be selected in one percent increments to more closely control the output of the alternator 12. An additional advantage is that when changing from one desired duty cycle to another (e.g., from 50% to 75%), the transition is very smooth and does not cause an abrupt change such as might occur when switching between, for example, a 12.5% duty cycle and an 87.5% duty cycle when only six or seven different, fixed duty cycles are available to select. The method of the present invention further allows the output of the alternator 12 to be more closely controlled to handle brief electrical impulses which may be caused by activation of the radiator fan, windshield or rear window defrosters, windshield wiper motors, etc., which, at engine idle speeds, might cause objectionable sudden increases or decreases in engine RPM and/or system battery voltage.

The method of the present invention further enables a more steady-state charging signal to be applied to the vehicle battery than with previously developed systems. Consequently, there is significantly less chance of the battery being stressed or damaged over a long period of time due to fluctuating alternator output voltage resulting from various electrical impulse loads experienced by the alternator.

Yet another advantage of the present invention is that the computations involved are extremely simple and do not require significant processing power. One summing action and one decision determines whether or not the output port of the controller is turned "ON" or "OFF" to produce the desired duty cycle. Changes from one duty cycle to another occur smoothly and quickly, thereby insuring a steady-state output from the alternator.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

I claim:

1. A method for controlling operation of an alternator by controlling a duty cycle of a pulse width modulated (PWM) signal applied to the alternator, wherein the signal is applied by controllably turning "ON" and "OFF" a port of a controller operably associated with said alternator, said method comprising the steps of:
   a) setting a running sum value to zero;
   b) defining a time interval;
   c) determining a desired duty cycle value for said PWM signal needed to be applied to said alternator;
   d) adding said desired duty cycle to said running sum value;
   e) determining if said running sum value is less than a predetermined value and, if so, then causing said controller to turn "OFF" said port to thereby interrupt said signal to said alternator for said time interval;
   f) determining if said running sum value is greater than or equal to said predetermined value and, if so, then causing said controller to turn "ON" said port to thereby apply said signal to said alternator for said time interval and subtracting said predetermined value from said running sum value; and
   g) after the expiration of said time interval, repeating steps d), e) and f).

2. The method of claim 1, wherein step e) further comprises the step of defining said predetermined value as a value of 100.

3. The method of claim 1, wherein step f) further comprises the step of determining if said running sum is greater than or equal to said predetermined value.

4. The method of claim 3, further comprising the step of defining said predetermined value as a value of 100.

5. The method of claim 1, further comprising the step of defining said time interval to be between about one and five milliseconds.

6. A method for controlling operation of an alternator by controlling a duty cycle of a pulse width modulated signal applied to the alternator, wherein the signal is applied by controllably turning "ON" and "OFF" a port of a controller operably associated with said alternator, said method comprising the steps of:
   a) setting a running sum value to zero;
   b) defining a time interval;
   c) determining a desired duty cycle value for said pulse width modulated signal needed to be applied to said alternator;

d) adding said desired duty cycle value to said running sum value;

e) if said running sum value is less than 100, then causing said controller to turn "OFF" said port to thereby interrupt said signal to said alternator for said time interval;

f) if said running sum value is greater than or equal to 100, then causing said controller to turn "ON" said port to thereby apply said signal to said alternator for said time interval, and subtracting 100 from said running sum value;

g) after the expiration of said time interval, repeating steps d) and e) and f).

7. The method of claim 6, wherein the step of determining if said running sum value is less than 100 comprises the step of determining if said running sum value is equal to or greater than 100.

8. The method of claim 6, wherein said step of defining a time interval comprises the step of defining a time interval within a range of about 1 ms–5 ms.

9. The method of claim 6, further comprising the step of modifying said desired duty cycle value before performing step d).

10. A method for controlling operation of an alternator comprising the steps of:

a) using a controller to generate a pulse-width-modulated (PWM) signal having a specified duty cycle signal for energizing a field winding of said alternator;

b) setting a running sum value to zero;

c) using said controller to determine a desired duty cycle value for said PWM signal;

d) adding said desired duty cycle value to said running sum value;

e) using said controller to determine if said running sum value is greater than or equal to a first predetermined value;

f) if said running sum value is greater than or equal to said predetermined value, then causing said controller to turn "ON" said PWM signal to said field winding of said alternator for a predetermined time interval, and subtracting a second predetermined value from said running sum value;

g) if said running sum value is less than said first predetermined value, then causing said controller to turn "OFF" said PWM signal if said PWM signal is presently in a turned "ON" state, or to remain in a turned "OFF" state for said predetermined time interval; and h) repeating steps c) through g).

11. The method of claim 10, wherein the first and second predetermined values are equal.

12. The method of claim 11, wherein said first and second predetermined values are each equal to 100.

13. The method of claim 10, wherein said first predetermined value is equal to 100.

14. The method of claim 10, further comprising the step of storing said running sum value in a memory associated with said controller after performing step d).

* * * * *